(12) United States Patent
Takahashi et al.

(10) Patent No.: US 9,344,126 B2
(45) Date of Patent: May 17, 2016

(54) RECEIVING APPARATUS, RECEIVING METHOD, AND PROGRAM

(75) Inventors: Hiroo Takahashi, Tokyo (JP); Yuken Goto, Tokyo (JP); Takuya Okamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 24 days.

(21) Appl. No.: 14/003,664

(22) PCT Filed: Mar. 29, 2012

(86) PCT No.: PCT/JP2012/058376
§ 371 (c)(1),
(2), (4) Date: Sep. 6, 2013

(87) PCT Pub. No.: WO2012/137660
PCT Pub. Date: Oct. 11, 2012

(65) Prior Publication Data
US 2013/0336433 A1    Dec. 19, 2013

(30) Foreign Application Priority Data

Apr. 7, 2011  (JP) .................................. 2011-085333

(51) Int. Cl.
*H04B 1/10* (2006.01)
*H04N 5/44* (2011.01)
(Continued)

(52) U.S. Cl.
CPC ............. *H04B 1/1036* (2013.01); *H04H 20/76* (2013.01); *H04H 20/93* (2013.01); *H04L 27/2666* (2013.01); *H04N 5/4401* (2013.01);
(Continued)

(58) Field of Classification Search
CPC .. H04L 5/0007; H04L 27/2647; H04L 1/0045

USPC .......................................... 375/340–343, 350
See application file for complete search history.

(56) References Cited

U.S. PATENT DOCUMENTS

| 5,852,630 A * | 12/1998 | Langberg et al. ............ 375/219 |
| 2010/0034219 A1* | 2/2010 | Stadelmeier et al. ......... 370/478 |
| 2011/0274204 A1* | 11/2011 | Ko et al. ....................... 375/295 |

FOREIGN PATENT DOCUMENTS

| JP | 2004-364175 A | 12/2004 |
| JP | 2009-296586 A | 12/2009 |
| WO | WO-2006/030974 A1 | 3/2006 |

OTHER PUBLICATIONS

International Search Report; International Application No. PCT/JP2012/058376; Filed: Mar. 29, 2012; Mailing Date of the International Search Report: Jun. 5, 2012 (Form PCT/ISA/210).

(Continued)

*Primary Examiner* — David S Huang
(74) *Attorney, Agent, or Firm* — Michael Best & Friedrich LLP

(57) ABSTRACT

Disclosed are a receiving apparatus, a receiving method, and a program capable of reliably obtaining predetermined information. In a case where a broadband signal where the same control information is arranged in different frequency bands is received and processed, a frequency where the control information is stably received is detected, and the control information is obtained again using the detected frequency. This frequency detection is performed by detecting a frequency capable of avoiding a no-signal band in a signal array of the broadband signal determined based on the obtained control information and the like. This technology can be applied to a receiving apparatus that receives a signal conforming to a DVB-C2 standard.

10 Claims, 13 Drawing Sheets

(51) Int. Cl.
*H04N 5/50* (2006.01)
*H04N 21/426* (2011.01)
*H04N 21/61* (2011.01)
*H04L 27/26* (2006.01)
*H04H 20/76* (2008.01)
*H04H 20/93* (2008.01)
*H04L 1/20* (2006.01)

(52) U.S. Cl.
CPC .......... *H04N 5/50* (2013.01); *H04N 21/42607* (2013.01); *H04N 21/6118* (2013.01); *H04L 1/20* (2013.01); *H04L 27/2655* (2013.01); *H04L 27/2685* (2013.01)

(56) References Cited

OTHER PUBLICATIONS

DVB Document A138, "Digital Video Broadcasting (DVB), Frame structure channel coding and modulation for a second generation digital transmission system for cable systems (DVB-C2)," dated Jun. 2010.

Written Opinion of the International Searching Authority; International Application No. PCT/JP2012/058376; International Filing Date: Mar. 29, 2012; Dated: Jun. 5, 2012. (Form PCT/ISA/220 and PCT/ISA/237).

* cited by examiner

FIG. 6

| | Field | Size (bits) |
|---|---|---|
| 1 | NETWORK_ID | 16 |
| 2 | C2_SYSTEM_ID | 16 |
| 3 | START_FREQUENCY | 24 |
| 4 | C2_BANDWIDTH | 16 |
| 5 | GUARD_INTERVAL | 2 |
| 6 | C2_FRAME_LENGTH | 10 |
| 7 | L1_PART2_CHANGE_COUNTER | 8 |
| 8 | NUM_DSLICE | 8 |
| 9 | NUM_NOTCH | 4 |
| 10 | for i=0..NUM_DSLICE−1 { | |
| 11 |    DSLICE_ID | 8 |
| 12 |    DSLICE_TUNE_POS | 14 or 13 |
| 13 |    DSLICE_OFFSET_LEFT | 9 or 8 |
| 14 |    DSLICE_OFFSET_RIGHT | 9 or 8 |
| 15 |    DSLICE_TI_DEPTH | 2 |
| 16 |    DSLICE_TYPE | 1 |
| 17 |    if DSLICE_TYPE=='1' { | |
| 18 |       FEC_HEADER_TYPE | 1 |
| 19 |    } | |
| 20 |    DSLICE_CONST_CONF | 1 |
| 21 |    DSLICE_LEFT_NOTCH | 1 |
| 22 |    DSLICE_NUM_PLP | 8 |
| 23 |    for i=0..DSLICE_NUM_PLP−1 { | |
| 24 |       PLP_ID | 8 |
| 25 |       PLP_BUNDLED | 1 |
| 26 |       PLP_TYPE | 2 |
| 27 |       PLP_PAYLOAD_TYPE | 5 |
| 28 |       if PLP_TYPE=='00' or '01' { | |
| 29 |          PLP_GROUP_ID | 8 |
| 30 |       } | |
| 31 |       if DSLICE_TYPE=='0' { | |
| 32 |          PLP_START | 14 |
| 33 |          PLP_FEC_TYPE | 1 |
| 34 |          PLP_MOD | 3 |
| 35 |          PLP_COD | 3 |
| 36 |       } | |
| 37 |       PSI/SI_REPROCESSING | 1 |
| 38 |       if PSI/SI_REPROCESSING=='0' { | |
| 39 |          transport_stream_id | 16 |
| 40 |          original_network_id | 16 |
| 41 |       } | |
| 42 |       RESERVED_1 | 8 |
| 43 |    } | |
| 44 |    RESERVED_2 | 8 |
| 45 | } | |
| 46 | for i=0..NUM_NOTCH−1 | |
| 47 |    NOTCH_START | 14 or 13 |
| 48 |    NOTCH_WIDTH | 9 or 8 |
| 49 |    RESERVED_3 | 8 |
| 50 | } | |
| 51 | RESERVED_TONE | 1 |
| 52 | RESERVED_4 | 16 |

RECEIVING APPARATUS, RECEIVING METHOD, AND PROGRAM

TECHNICAL FIELD

The present technology relates to a receiving apparatus, a receiving method, and a program. More particularly, the present technology relates to a receiving apparatus, a receiving method, and a program that determines a frequency band capable of reliably obtaining predetermined information contained in a broadband signal and obtains the information using the frequency band.

BACKGROUND ART

In recent years, there has been an outstanding progress in a digitalization technology of a broadcast system. In a terrestrial television broadcast system in Japan or Europe, a modulation scheme called an orthogonal frequency division multiplexing (OFDM) resistant to an influence of a multi-path interference is employed in modulation.

The OFDM scheme is also employed in a European cable broadcasting system. According to a second generation European cable digital broadcasting standard DVB-C2, in order to prevent an interference with other communication channels, data is not transmitted by setting a transmission power to zero in a certain frequency band called a notch while a signal is transmitted (for example, refer to Non-Patent Document 1).

CITATION LIST

Non-Patent Document

Non-Patent Document 1: Digital Video Broadcasting (DVB), Frame structure channel coding and modulation for a second generation digital transmission system for cable systems (DVB-C2), DVB Document A138

SUMMARY OF THE INVENTION

Problems to be Solved by the Invention

According to DVB-C2, a notch is provided in order to prevent an interference with other communication channels, so that it is possible to eliminate necessity of providing a guard band between channels, and a relatively narrow band interposed between the notches can be used to transmit data. Therefore, it is possible to effectively use a frequency band. In addition, according to DVB-C2, since a parameter used to demodulate data is also transmitted, it is necessary to reliably receive and process the parameter.

In view of the aforementioned problems, the present technology provides a receiving apparatus, a receiving method, and a program capable of reliably receiving and processing predetermined transmitted data.

Solutions to Problems

According to an aspect of the present technology, there is provided a receiving apparatus including: a receiving (Rx) unit that receives a broadband signal obtained by arranging same control information in different frequency band; and a detection unit that detects a frequency where the control information is stably received.

The detection unit may obtain the control information and detects the frequency based on the obtained control information.

The broadband signal may be a signal conforming to a DVB-C2 standard, and the control information may be L1 information.

The broadband signal may be a signal including a no-signal band which is a frequency band that does not transmit a desired signal, and the detection unit may detect a frequency distant from the no-signal band.

The detection unit may detect a frequency distant from an end of the broadband signal.

The detection unit may detect a frequency where a total width of the no-signal band existing in an Rx band set using a predetermined frequency is small.

The detection unit may detect another frequency if it is determined that a receiving condition is bad when a signal is received using the Rx band set using the frequency detected by the detection unit.

According to an aspect of the present technology, there is provided a receiving method including: receiving a broadband signal obtained by arranging same control information in different frequency bands; and detecting a frequency where the control information is stably received.

According to an aspect of the present technology, there is provided a program causing a computer to function as: a receiving (Rx) unit that receives a broadband signal obtained by arranging same control information in different frequency band; and a detection unit that detects a frequency where the control information is stably received.

According to an aspect of the present technology, a broadband signal where same control information is arranged in different frequency bands is received, and a frequency suitable for stably receiving the control information is detected from the broadband signal.

Effects of the Invention

According to an aspect of the present technology, it is possible to receive and process predetermined transmitted data.

BRIEF DESCRIPTION OF DRAWINGS

FIG. 6 is a diagram illustrating parameters included in L1 information.

MODE FOR CARRYING OUT THE INVENTION

Hereinafter, embodiments of the present technology will be described with reference to the accompanying drawings.

In the following description, description will be made by exemplifying a broadcasting scheme in a standard called DVB-C2. However, the technology described below may be applicable to other broadcast schemes or data transmission schemes.

<Exemplary Configuration of Receiving Apparatus>

Figure 1:
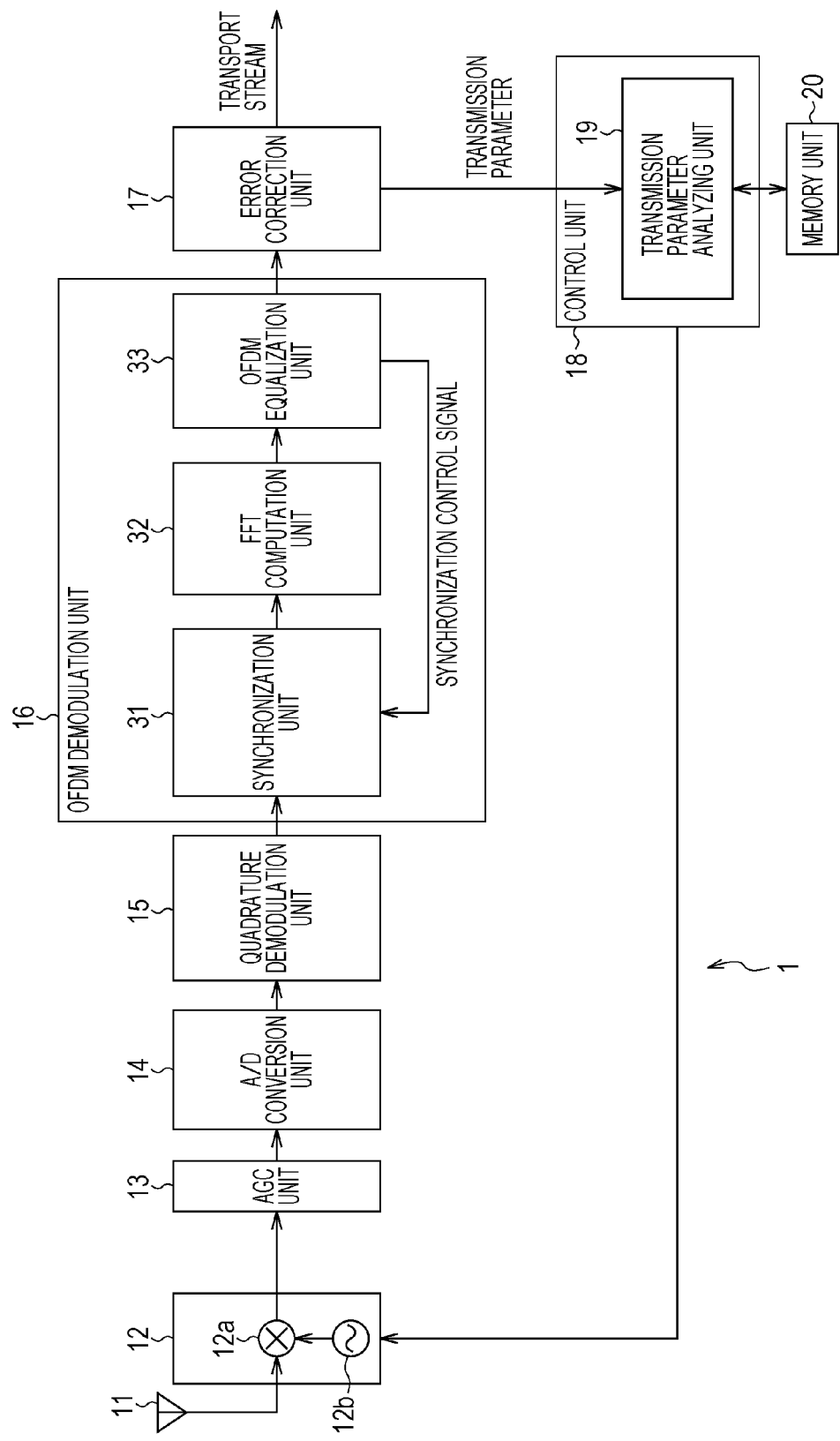
FIG. 1 is a block diagram illustrating a configuration of a receiving apparatus according to an embodiment.

FIG. 1 illustrates an exemplary configuration of a receiving apparatus according to an embodiment. A receiving apparatus 1 of FIG. 1 is an orthogonal frequency division multiplexing (OFDM) receiving apparatus that receives a broadcast wave of an OFDM signal transmitted from a transmitter of a broadcast station (not illustrated). An antenna 11 receives a broadcast wave (radio frequency (RF) signal) of the transmitted OFDM signal and outputs the broadcast wave to a tuner 12. The tuner 12 includes a computation unit 12a and a local oscillator 12b.

The computation unit 12a converts the RF signal to an intermediate frequency (IF) signal by multiplying the RF signal from the antenna 11 and the signal from the local oscillator 12b and outputs the IF signal to an automatic gain control (AGC) unit 13. The local oscillator 12b oscillates a sinusoidal signal having a predetermined frequency and outputs the sinusoidal signal to the computation unit 12a. The AGC unit 13 performs gain control for the supplied IF signal to obtain a constant signal level. The AGC unit 13 outputs the IF signal subjected to the gain control to an A/D conversion unit 14.

The A/D conversion unit 14 performs analog-digital (A/D) conversion for the IF signal from the AGC unit 13 and outputs the digital IF signal to a quadrature demodulation unit 15. The quadrature demodulation unit 15 performs quadrature demodulation for the IF signal from the A/D conversion unit 14 using a carrier wave having a predetermined frequency and outputs a baseband OFDM signal to the OFDM demodulation unit 16. Hereinafter, the baseband OFDM signal output from the quadrature demodulation unit 15 will be referred to as an OFDM time domain signal. As a result of the quadrature demodulation, the OFDM time domain signal is converted into a complex signal containing a real axis component (I-component) and an imaginary axis component (Q-component).

The OFDM demodulation unit 16 includes a synchronization unit 31, a fast Fourier transform (FFT) computation unit 32, and an OFDM equalization unit 33. The synchronization unit 31 synchronizes the OFDM symbol as a unit of signal transmission in the OFDM scheme. That is, the synchronization unit 31 determines a start position of a FFT block as a signal block for performing FFT in the FFT computation unit 32. The synchronization unit 31 can determine the start position of the FFT block based on the OFDM time domain signal before the FFT. However, after an equalization process in the OFDM equalization unit 33, the start position of the FFT block may be determined based on the equalized signal obtained by correcting a distortion in a transmission line. In this case, a synchronization control signal determined based on the equalized signal obtained by correcting a distortion in a transmission line is supplied from the OFDM equalization unit 33.

The FFT computation unit 32 sets, as a FFT block, a block corresponding to an effective symbol length from the start position of the FFT block determined by the synchronization unit 31 for the OFDM time domain signal from the quadrature demodulation unit 15. In addition, the FFT computation unit 32 extracts a signal of the FFT block from the OFDM time domain signal and performs FFT computation for the extracted signal. Through the FFT computation using the FFT computation unit 32, data transmitted through a subcarrier, that is, the OFDM signal representing a transmission symbol on an I-Q plane is obtained. The OFDM signal obtained through the FFT computation for the OFDM time domain signal is a frequency domain signal. Hereinafter, the OFDM signal subjected to the FFT computation will be referred to as an OFDM frequency domain signal.

The OFDM equalization unit 33 performs an equalization process for the OFDM frequency domain signal subjected to the FFT computation, in which an amplitude and a phase of the received signal is equalized to those of the transmitted signal, and outputs a resultant equalized signal. In the OFDM scheme, in which a quadrature amplitude modulation (QAM) modulation scheme is used as a modulation scheme for each subcarrier, a transmission signal is influenced by a multi-path propagation and the like. Therefore, amplitudes and phases of each carrier become different between the receive (Rx) side and the transmit (Tx) side. For example, a multi-path influence is generated due to reflection on a mountain or a building or a single frequency network (SFN).

In the OFDM scheme, an existing signal having a predetermined amplitude and a predetermined phase is discretely inserted into a transmission symbol of the transmission signal as a pilot signal. In the Rx side, a frequency characteristic of the transmission line is obtained based on the amplitude and the phase of the pilot signal to equalize the received signal.

An error correction unit 17 performs de-interleaving for the equalized signal supplied from the OFDM equalization unit 33. In addition, the error correction unit 17 performs various processes such as de-puncturing, Viterbi decoding, removal of a spread spectrum signal, and Reed Solomon (RS) decoding. The error correction unit 17 outputs the decoded data (transport stream) obtained by performing various processes to an external output unit, an output buffer, or the like located in the subsequent stage. In addition, the error correction unit 17 outputs, to a transmission parameter interpreting unit 19 of a control unit 18, various transmission parameters as transmission control information out of the decoded data subjected to processing such as de-interleaving or error correction.

The control unit 18 controls each part of the receiving apparatus 1. For example, the control unit 18 sets an Rx frequency depending on an Rx channel set in a manipulation unit (not illustrated). That is, an oscillation frequency of the local oscillator 12b is set such that a predetermined frequency is output from the local oscillator 12b depending on the Rx frequency.

The control unit 18 has a transmission parameter interpreting unit 19. The transmission parameter interpreting unit 19 interprets the transmission parameters supplied from the error correction unit 17 and appropriately supplies necessary information to each part of the receiving apparatus 1. For example, the transmission parameter interpreting unit 19 obtains frequency band information representing a no-signal band out of the frequency bands that can be received by the receiving apparatus 1 and information on a frequency used to read a predetermined channel as one of the transmission parameters. Such information is supplied to and stored in a memory unit 20 as necessary. The information stored in the memory unit 20 is used in tuning and the like.

Description will now be made for a receiving process of the receiving apparatus 1 by exemplifying a case where the receiving apparatus 1 configured as described above receives and processes DVB-C2 as a second generation European cable digital broadcasting standard.

<DVB-C2 Signal>

Figure 2:
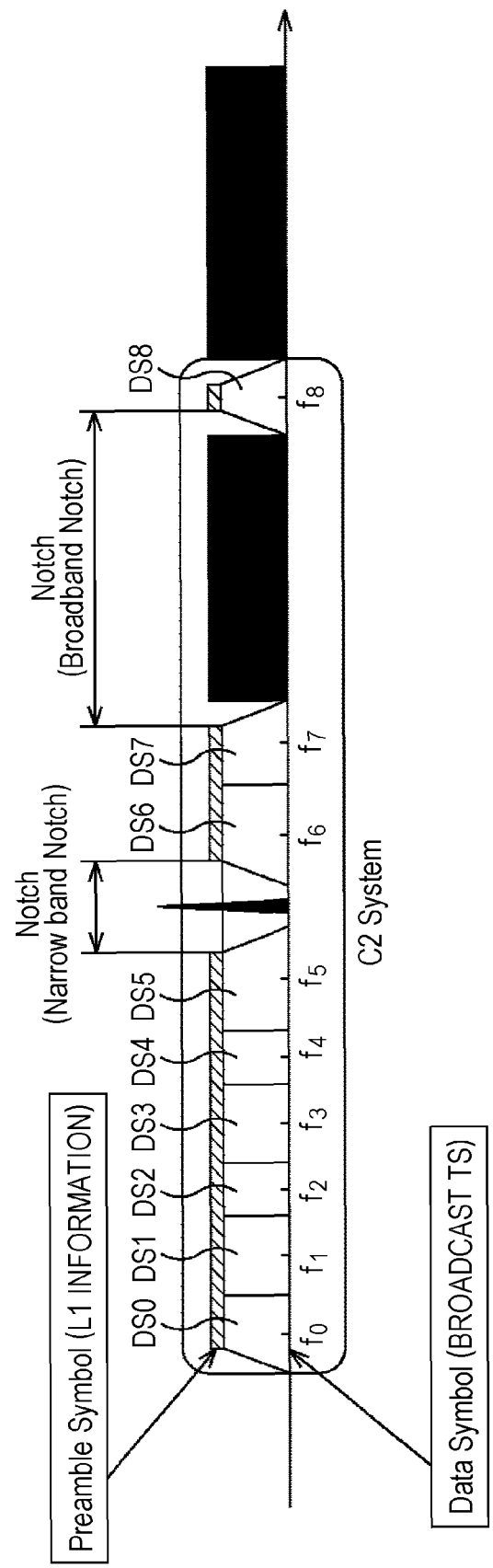
FIG. 2 is a diagram illustrating an exemplary DVB-C2 signal.

First, description will be made for a signal of DVB-C2 (hereinafter, also referred to as a DVB-C2 signal). FIG. 2 illustrates an exemplary DVB-C2 signal. In FIG. 2, the abscissa denotes a frequency. One signal of the DVB-C2 is called "C2 System". The C2 System includes Preamble Symbol and Data Symbol. According to the standard, one C2 System is a signal having a bandwidth of approximately 3.5 GHz at maximum.

Preamble Symbol is a symbol used to transmit L1 information (L1 signaling part 2 data) which is transmission control information. Information on a frequency band that does not transmit a signal is transmitted as a part of the L1 information. Using the Preamble Symbol, the same information is repeatedly transmitted at a cycle of 3,408 carriers (at a cycle of 3,408 subcarriers of OFDM). The 3,408 carriers correspond to a frequency band of 7.61 MHz.

Data Symbol is a symbol used to transmit Transport Stream (TS) such as program data. Data Symbol is divided into blocks called Data Slice. For example, different program data are transmitted using Data Slice 1 (DS1) and Data Slice 2 (DS2). Parameters regarding each Data Slice such as the number of Data Slices are also contained in the L1 information.

The frequency band indicated by a black portion in FIG. 2 is a frequency band reserved for FM broadcast, police wireless communication, military wireless communication, and the like and is not used to transmit C2 System. That is, the frequency band indicated by the black portion is a no-signal band out of a transmission signal output from a transmitter in C2 System and is referred to as a notch band.

The notch band includes a narrowband notch having a bandwidth smaller than 48 subcarriers and a broadband notch having a bandwidth greater than 47 subcarriers (equal to or greater 48 subcarriers). Information on the notch band such as the number of notches or bandwidths of each notch band is contained in the L1 information, which is transmission control information, as a transmission parameter.

<Configuration of C2 Frame>

Figure 3:
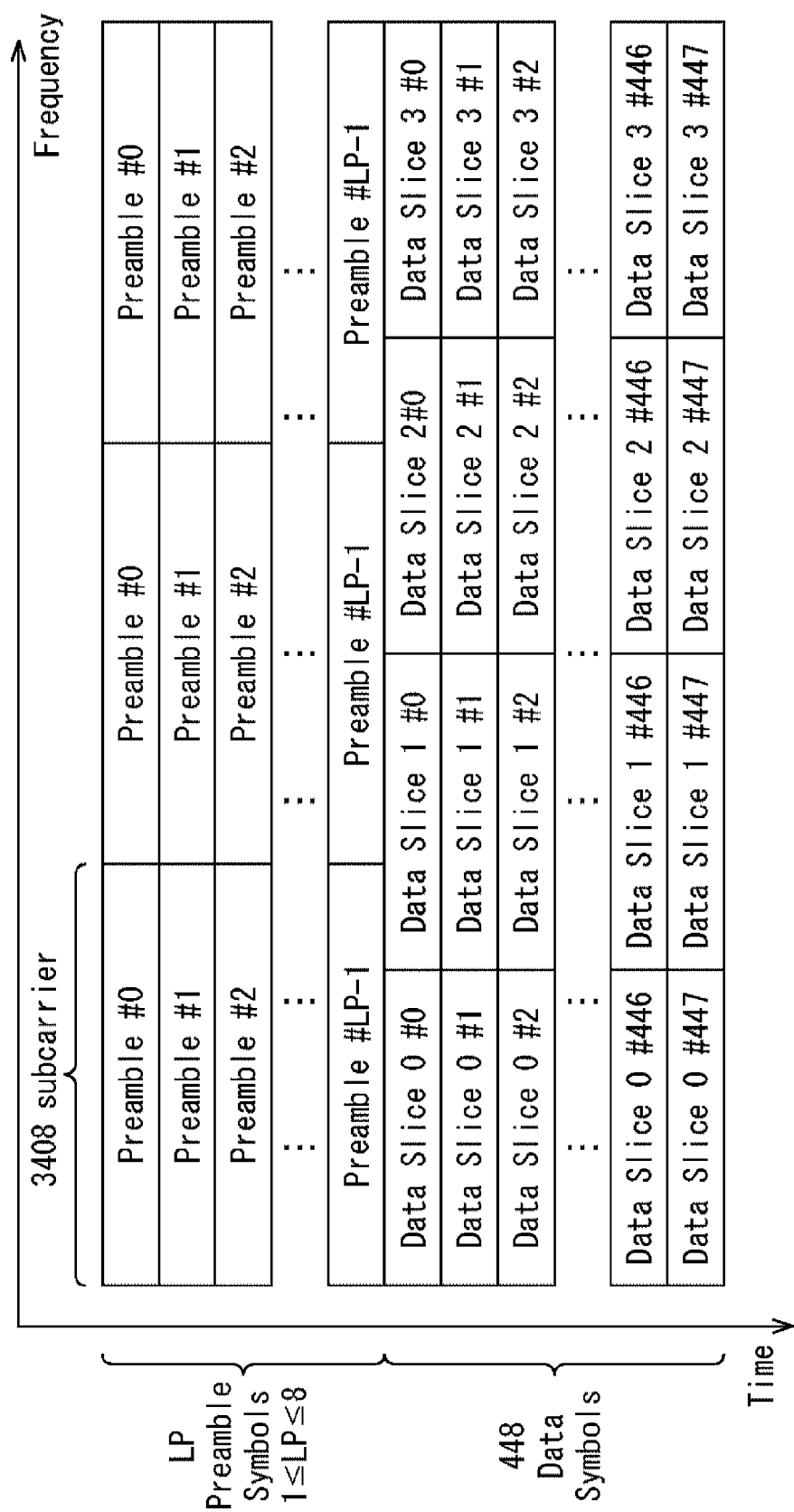
FIG. 3 is a diagram illustrating a configuration of C2 Frame.

FIG. 3 is a diagram illustrating a configuration of C2 Frame. The C2 Frame includes at least one Preamble Symbol and a plurality of Data Symbols. In FIG. 3, the abscissa denotes a frequency, and the ordinate denotes time (symbol). Preamble Symbol is repeatedly transmitted at a cycle of 3,408 subcarriers across first and eighth symbols as seen in a time direction.

The blocks of the Preamble Symbol denoted by the same reference numeral in FIG. 3 refer to the Preamble Symbol used to transmit the same L1 information. In addition, subsequent to the Preamble Symbol, Data Symbol is transmitted across 448 symbols as seen in a time direction. In the example of FIG. 3, each of data of Data Slices 0 to 3 is transmitted using 448 Data Symbols.

<Narrowband Notch>

Figure 4:
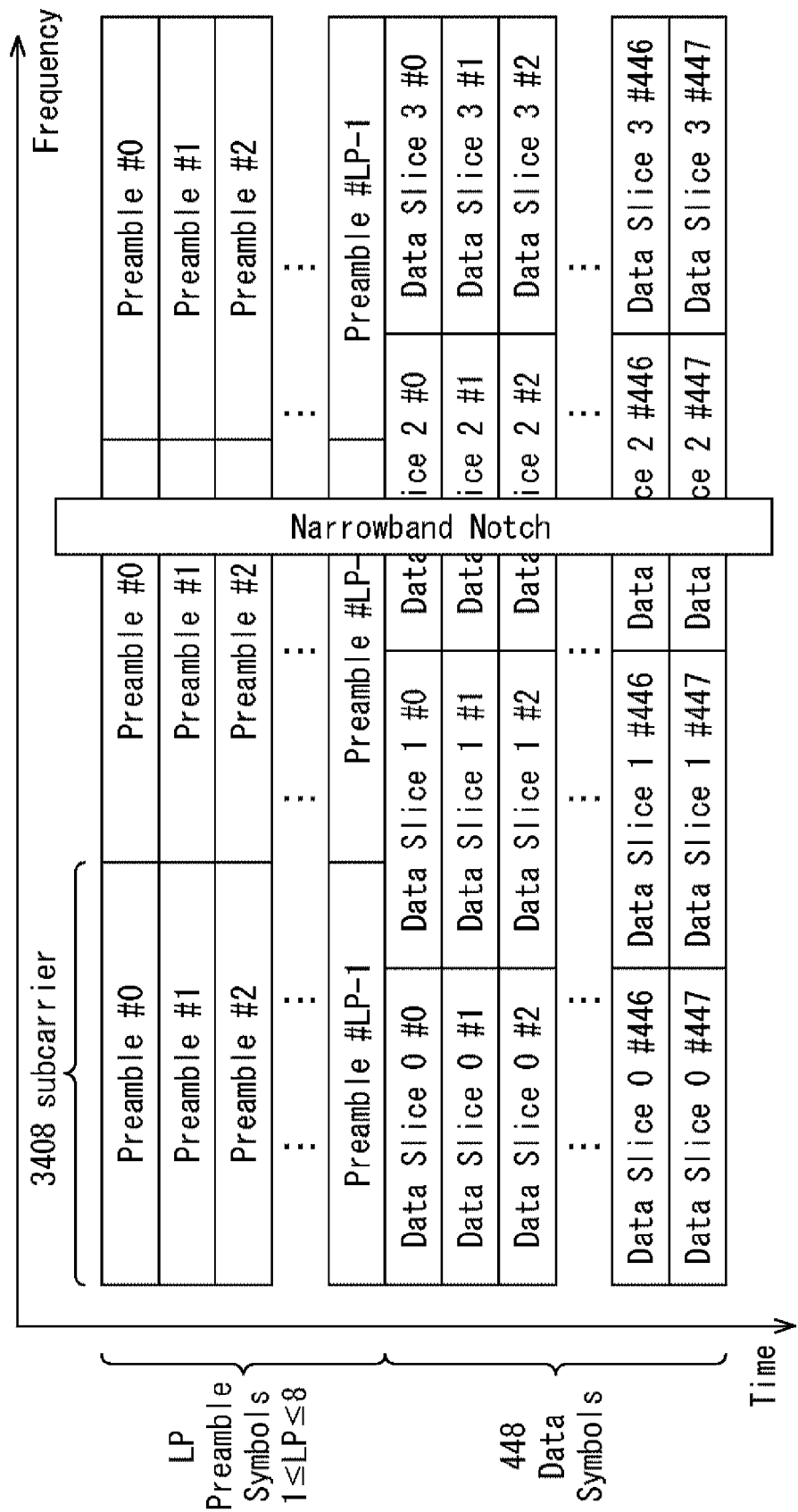
FIG. 4 is a diagram illustrating a configuration of C2 Frame in a case where a narrowband notch exists.

FIG. 4 illustrates a configuration of C2 Frame in a case where a narrowband notch exists. The narrowband notch has a bandwidth smaller than 48 subcarriers, and a single narrowband notch is allocated to 3,408 subcarriers. No data is contained in the notch band of Data Symbol, and the L1 information of Preamble Symbol of the notch band can be obtained (recovered) through an error correction process.

<Broadband Notch>

Figure 5:
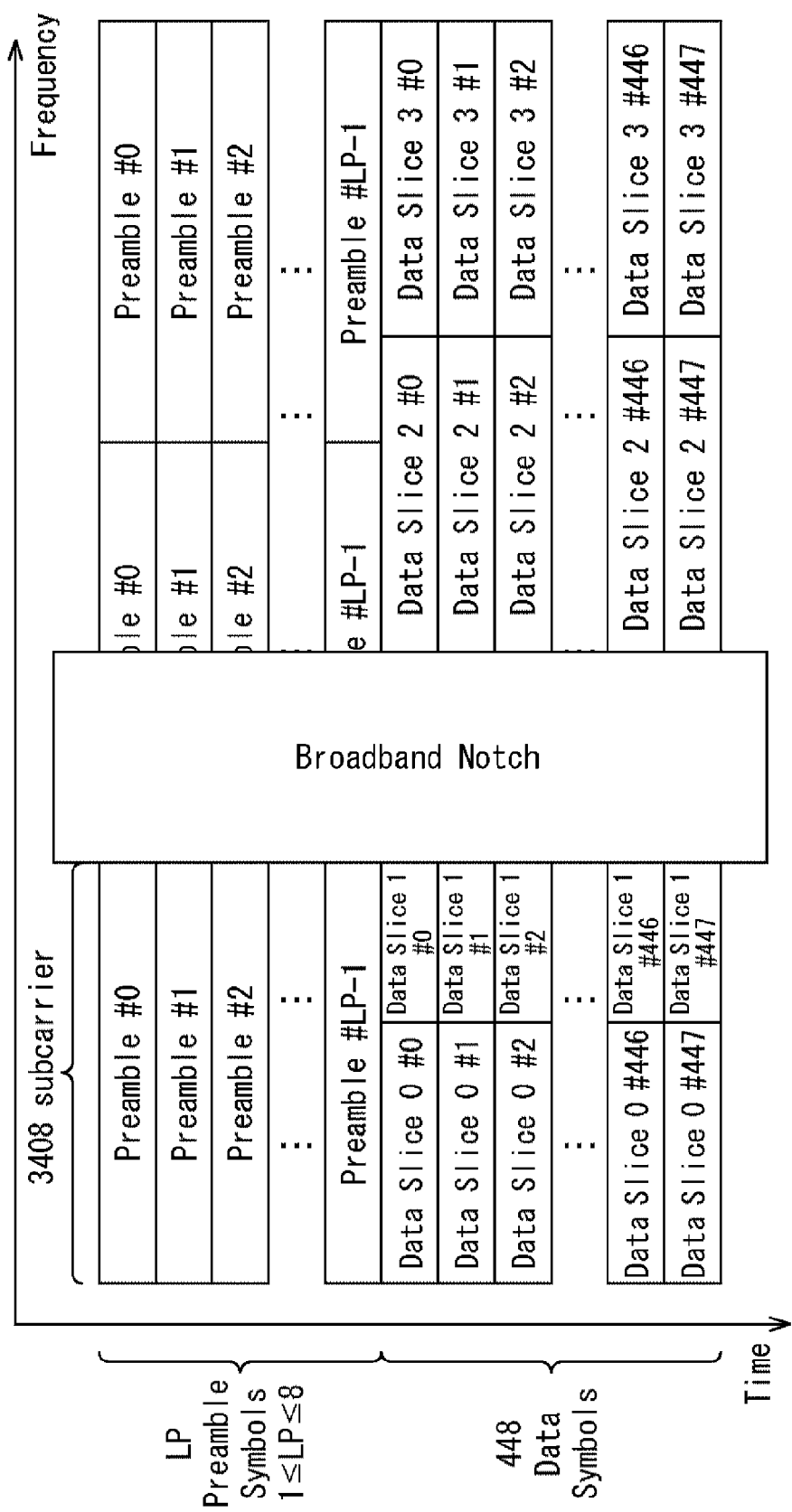
FIG. 5 is a diagram illustrating a configuration of C2 Frame in a case where a broadband notch exists.

FIG. 5 illustrates a configuration of C2 Frame in a case where a broadband notch exists. The bandwidth of the broadband notch is greater than 47 subcarriers, and the broadband notch is arranged between a pair of Data Slices. In addition, the broadband notch is arranged at an interval of 3,408 or more subcarriers. Therefore, the notch band does not contain L1 information of Preamble Symbol and data of Data Symbol.

In this manner, according to DVB-C2, it is not necessary to provide a guard band between channels, and a relatively narrow band interposed between the Notches can also be used to transmit data. Therefore, it is possible to effectively use frequency bands. The receiving apparatus 1 receives a signal within a range of an Rx frequency band having a bandwidth corresponding to 3,409 subcarriers at maximum and decodes L1 information. Then, the receiving apparatus 1 decodes program data based on the decoded L1 information.

<L1 Information>

Description will now be made for the decoded L1 information. FIG. 6 is a diagram illustrating parameters contained in L1 information. Description will focus on main parameters. "START_FREQUENCY" in the 3rd row denotes a frequency serving as a start position of C2 System. The start position is represented by an absolute frequency from 0 Hz. "C2_BANDWIDTH" in the 4th row denotes a bandwidth of C2 System.

"GUARD_INTERVAL" in the 5th row denotes a size of the guard interval included in each symbol. "C2_FRAME_LENGTH" in the 6th row denotes the number of Data Symbols contained in C2 Frame. In the example of FIG. 6, a value "448" is set to "C2_FRAME_LENGTH".

"NUM_DSLICE" in the 8th row denotes the number of Data Slices contained in C2 Frame. "NUM_NOTCH" in the 9th row denotes the number of Notches contained in C2 Frame. Each parameter from the 10th to 45th rows is described for each Data Slice.

"DSLICE_ID" in the 11th row denotes an identification (ID) of Data Slice in C2 System. "DSLICE_TUNE_POS" in the 12th row denotes a position (center frequency) serving as a tuning point for receiving Data Slice with respect to a frequency represented by "START_FREQUENCY". "DSLICE_TI_DEPTH" in the 15th row denotes a depth of time interleaving.

"DSLICE_LEFT_NOTCH" in the 21st row denotes whether or not there is Notch in the left side of Data Slice. "DSLICE_NUM_PLP" in the 22nd row denotes the number of physical layer pipes (PLPs) contained in Data Slice. Each parameter described in the 23rd to 43rd rows is described for each PLP.

Each parameter of the 46th to 50th rows is described for each Notch. "NOTCH_START" of the 47th row denotes a location of Notch with respect to the frequency represented by "START_FREQUENCY". "NOTCH_WIDTH" of the 48th row denotes a bandwidth of Notch.

Details of DVB-C2 are described in "Digital Video Broadcasting (DVB); Frame structure channel coding and modulation for a second generation digital transmission system for cable systems (DVB-C2)" (DVB Document A138).

<Operation of Receiving Apparatus>

Next, description will be made for an operation of the receiving apparatus 1 of FIG. 1. The receiving apparatus 1 processes the received broadcast wave, demodulates program data desired by a user, and provides the program data to a user. In step S11, the control unit 18 sets an Rx frequency depending on an Rx channel set in a manipulation unit (not illustrated) and obtains L1 information. The Rx frequency is set in step S11 when L1 information is obtained because it is necessary to set the Rx frequency based on the L1 information.

Through the process in step S11, the Rx band and the center frequency for obtaining L1 information are set. The center frequency for obtaining the L1 information is set to a frequency set in the Tx side (C2_system_tuning_frequency). However, according to the present embodiment, a frequency capable of stably and accurately obtaining L1 information is detected and is set as the center frequency, as described below.

In step S12, the tuner 12 converts the RF signal received by the antenna 11 into an IF signal and outputs the IF signal. The IF signal output from the tuner 12 is supplied to the AGC unit 13.

In step S13, the AGC unit 13 performs automatic gain control for the supplied IF signal. That is, the AGC unit 13 controls a gain such that the signal level of the IF signal becomes constant. The IF signal subjected to the control is output to the A/D conversion unit 14. In step S14, the A/D conversion unit 14 performs analog-digital conversion for the IF signal from the AGC unit 13 and outputs the digital IF signal to the quadrature demodulation unit 15.

In step S15, the quadrature demodulation unit 15 performs quadrature demodulation for the IF signal from the A/D conversion unit 14 using a carrier having a predetermined frequency and outputs the OFDM time domain signal to the OFDM demodulation unit 16. In step S16, the synchronization unit 31 of the OFDM demodulation unit 16 synchronizes the OFDM symbol. That is, the synchronization unit 31 determines a start position of the FFT block as a signal block for causing the FFT computation unit 32 to perform FFT computation. Information on the determined start position of the FFT block is supplied to the FFT computation unit 32 in the subsequent stage.

In step S17, the FFT computation unit 32 performs FFT computation for the OFDM time domain signal. More specifically, the FFT computation unit 32 sets the FFT block based on the start position of the FFT block determined by the synchronization unit 31 and extracts a signal of the FFT block from the OFDM time domain signal. In addition, the FFT computation unit 32 performs FFT computation for the extracted OFDM time domain signal. In step S18, the OFDM equalization unit 33 equalizes the OFDM frequency domain signal subjected to the FFT computation such that an amplitude and a phase of the received signal match those of the Tx signal.

In step S19, the error correction unit 17 performs de-interleaving for the equalized signal supplied from the OFDM equalization unit 33 and various processes such as de-puncturing, Viterbi decoding, removal of a spread spectrum signal, and RS decoding. In addition, the error correction unit 17 extracts L1 information, as transmission control information, from the decoded data obtained by performing various processes and supplies the extracted L1 information to the transmission parameter interpreting unit 19 of the control unit 18. The extracted L1 information is supplied to the transmission parameter interpreting unit 19 and is interpreted (analyzed).

By analyzing the L1 information, a position of the data slice (center frequency) or a position of the notch is obtained. Based on such information, the program data are demodulated. That is, in step S20, a frequency of the tuner 12 is set to an Rx frequency corresponding to a channel instructed by a user. This setting is performed by reading the center frequency of Data Slice corresponding to the instructed channel based on the obtained L1 information and setting the center frequency as the frequency of the tuner 12.

In step 21, the tuner 12 converts the RF signal received by the antenna 11 into an IF signal and outputs the IF signal. In step S22, the AGC unit 13 performs automatic gain control for the IF signal. In step S23, the A/D conversion unit 14 performs analog-digital conversion for the IF signal from the AGC unit 13 and outputs the digital IF signal to the quadrature demodulation unit 15. In step S24, the quadrature demodulation unit 15 performs quadrature demodulation for the IF signal from the A/D conversion unit 14 using a carrier having a predetermined frequency and outputs the OFDM time domain signal to the OFDM demodulation unit 16.

In step S25, the synchronization unit 31 of the OFDM demodulation unit 16 synchronizes the OFDM symbol. In step S26, the FFT computation unit 32 performs FFT computation for the OFDM time domain signal of the FFT block. In step S26, the OFDM equalization unit 33 equalizes the OFDM frequency domain signal subjected to the FFT computation. In step S28, the error correction unit 17 performs de-interleaving for the equalized signal supplied from the OFDM equalization unit 33 and performs various processes such as de-puncturing, Viterbi decoding, removal of a spread spectrum signal, and RS decoding. In addition, the error correction unit 17 outputs a transport stream as program data corresponding to the Rx channel, obtained by performing various processes, to an external output unit, an output buffer, or the like in the subsequent stage, and the process is terminated.

In this manner, the program data is decoded based on the decoded L1 information obtained by decoding the L1 information. Therefore, it is necessary to reliably obtain transmission parameters and the like after obtaining the L1 information. In this regard, description will now be made for a process performed when the following L1 information is obtained. Here, description is made for the L1 information because it is assumed that DVB-C2 is employed by way of example. However, if other schemes are employed, naturally, the following process may be applied to information in other schemes. For example, the following process may be applied to integrated services digital broadcasting-terrestrial (ISDB-T) scheme. In this case, transmission and multiplexing configuration control (TMCC) information is obtained as such information.

<Frequency Setting to Obtain L1 Information>

Figure 8:
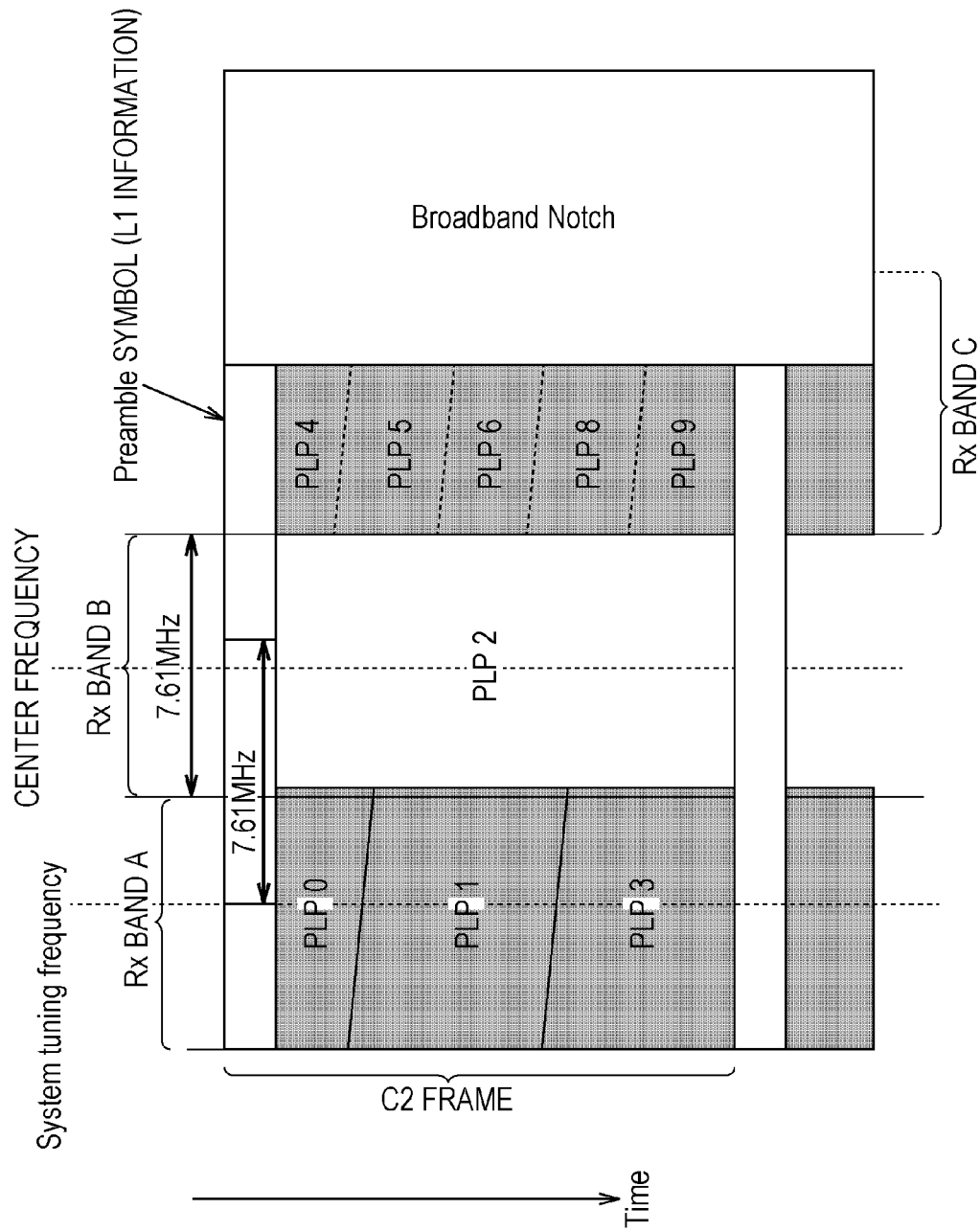
FIG. 8 is a diagram illustrating a receiving (Rx) band.

First, in the following description, in order to obtain L1 information as reliable as possible, a situation is assumed, in which it is difficult to obtain L1 information. FIG. 8 is a partially enlarged view illustrating C2 System of DVB-C2 of FIG. 2. In FIG. 8, an Rx band B is set on Data Slice containing PLP2 and is set to have a bandwidth of 7.61 MHz centered at the center frequency. For example, in a case where Data Slice including PLP4 is set as a tuning target, this Rx band is shifted to the corresponding Data Slice (in FIG. 8, illustrated as an Rx band C).

In a case where an Rx band is set to the Rx band C, the broadband notch is included in that Rx band. As described with reference to FIG. 5, the broadband notch is arranged between a pair of Data Slices and does not contain L1 information of Preamble Symbol and data of Data Symbol. Therefore, in a case where Data Slice is demodulated while such a broadband notch is included in the Rx band, it is difficult to obtain L1 information from this Rx band. Therefore, first, another Data Slice is set as an Rx band, and L1 information is obtained from that Rx band. Then, a demodulation operation is performed by setting that Rx band as an Rx band of Data Slice.

For example, in a case where Data Slice in the Rx band C is demodulated, for example, an Rx band A is set as an Rx band, and L1 information is obtained from the signal received within that Rx band. Then, parameters contained in the obtained L1 information are used, the Rx band is shifted to the Rx band C, and desired Data Slice is demodulated.

The L1 information is obtained from any part other than the desired Data Slice, such as when power is turned on or when channel switching is instructed, regardless of whether or not there is a notch band, and then, re-tuning is performed to the desired Data Slice. In FIG. 8, "C2_system_tuning_frequency" denotes a frequency designated as a frequency set when the Tx side obtains L1 information. After the frequency is set to "C2_system_tuning_frequency", and the L1 information is received and analyzed, an Rx band for receiving a desired channel is set, and a signal starts to be received.

In this manner, since it is difficult to obtain the L1 information in a case where a notch, particularly, the broadband notch exists, it is desirable to avoid such a broadband notch. In addition, since a frequency suitable for obtaining the L1 information is not limited to "C2_system_tuning_frequency", L1 information may be obtained using a more suitable frequency.

Similar to the broadband notch, it is desirable to avoid the narrowband notch. As described with reference to FIG. 4, the narrowband notch is configured such that a single narrowband notch is defined at a cycle of 3,408 carriers, the notch band of Data Symbol does not contain data, and L1 information of Preamble Symbol of the notch band can be obtained (recovered) through an error correction process. Therefore, even when the narrowband notch exists in the Rx band, it is possible to recover and obtain the narrowband notch through an error correction process. However, it is difficult to recover the narrowband notch depending on a channel condition in some cases. Therefore, it is desirable to avoid the narrowband notch if possible.

Figure 9:
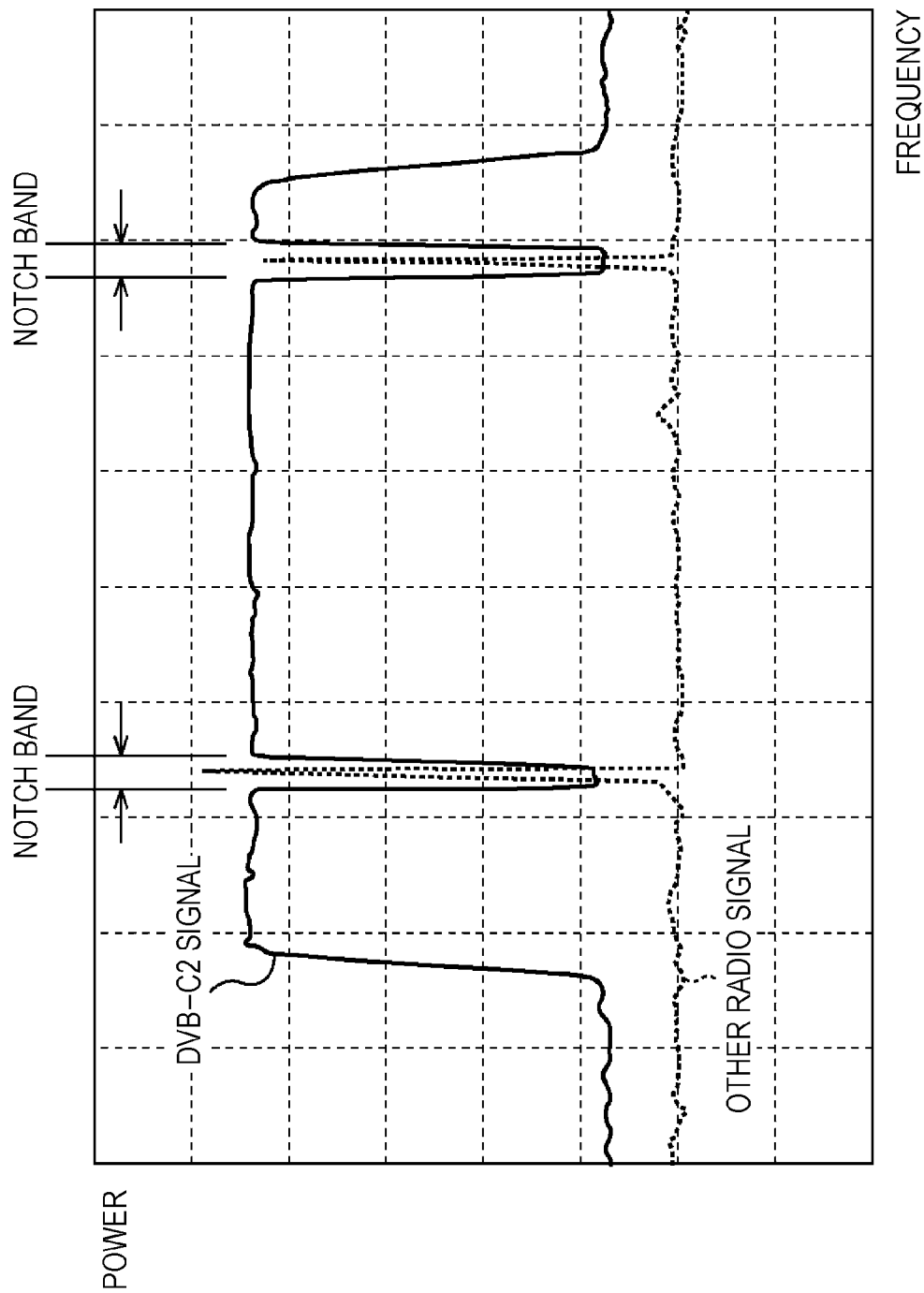
FIG. 9 is a diagram illustrating an influence of a notch.

FIG. 9 illustrates an exemplary frequency spectrum of the DVB-C2 signal existing in the narrowband notch. As illustrated in FIG. 9, power of a DVB-C2 signal is reduced in a band occupied by other radio signals, that is, where power (level) of other radio signals is enhanced. From the viewpoint of the receiving apparatus 1, signals other than the DVB-C2 signal entirely serve as an interference signal. Therefore, it is desirable to decode L1 information from a part of Data Slice that does not include a notch and is less influenced by an interference signal, compared to a case where L1 information is decoded from a part of Data Slice including such a notch.

As recognized from the aforementioned description, a part having no notch is suitable for obtaining L1 information. In this regard, a center frequency for obtaining L1 information satisfies Condition 1 described below. In addition, as described below, it is desirable that the center frequency for obtaining L1 information satisfies Conditions 2 and 3.

Condition 1: a center frequency is to be distant from a notch,

Condition 2: a center frequency is to be distant from an end of C2_System, and

Condition 3: a total width of the notch in the Rx band is to be small.

Here, it is assumed that a distance refers to a difference between the center frequency and a predetermined frequency. The distance from the notch refers to a difference between the center frequency and a frequency in one end of the band where the notch exists. A distance from an end of C2_System refers to a difference between the center frequency and a frequency where C2_System is initiated or terminated.

Figure 10:
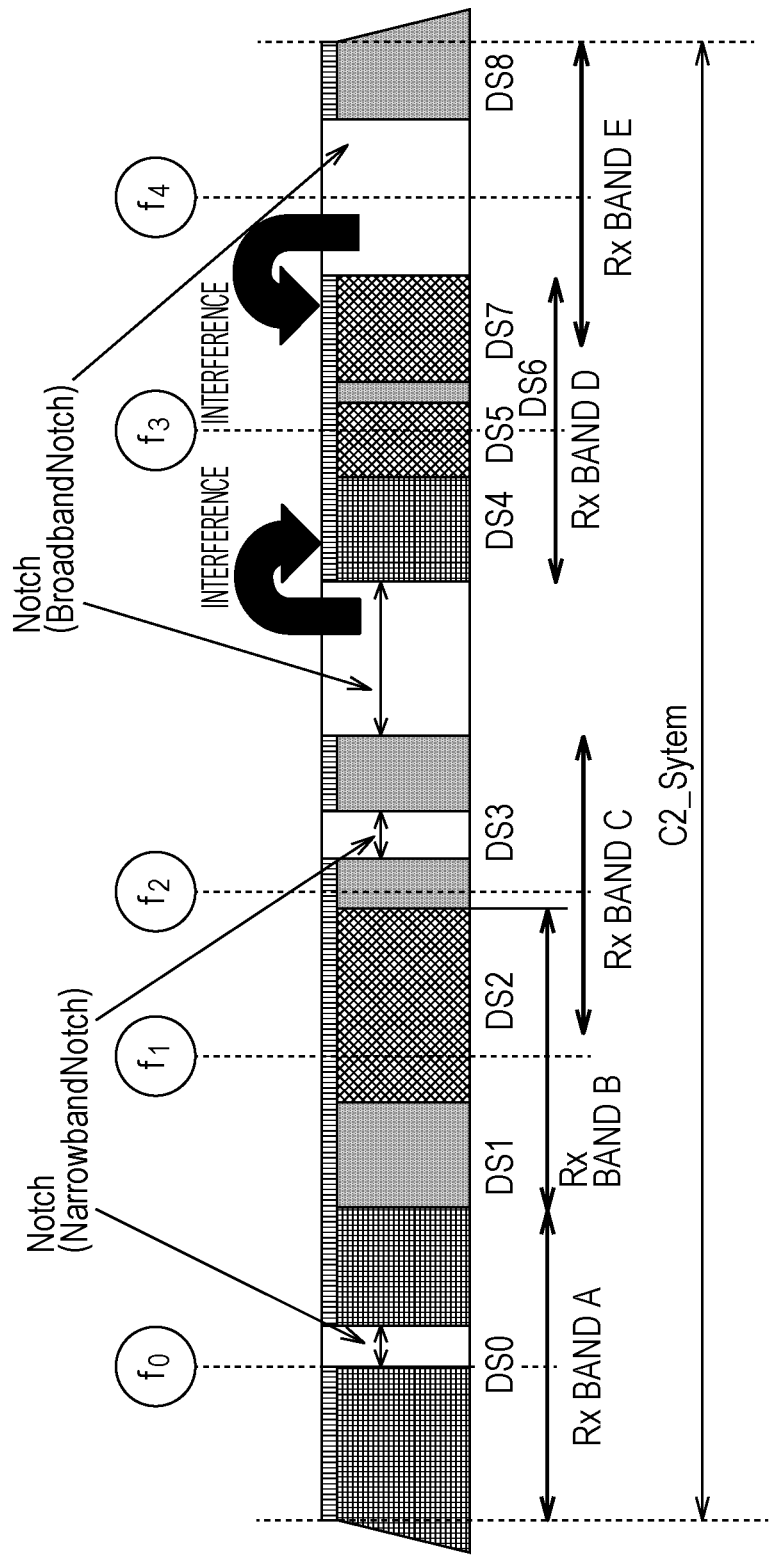
FIG. 10 is a diagram illustrating detection of an optimal center frequency.

Conditions 1 to 3 will be described in more detail with reference to FIG. 10. FIG. 10 illustrates C2 System in a case where five center frequencies ("DSLICE_TUNE_POS") are read from L1 information. Here, it is assumed that the center frequency is equal to "DSLICE_TUNE_POS". However, in practice, "DSLICE_TUNE_POS" itself does not mean the center frequency, but the center frequency is computed from "DSLICE_TUNE_POS".

In FIG. 10, a center frequency $f_0$ denotes a center frequency when Data Slice DS0 is read. A center frequency $f_1$ denotes a center frequency when Data Slice DS1 or DS2 is read. A center frequency $f_2$ denotes a center frequency when Data Slice DS3 is read. Similarly, a center frequency $f_3$ denotes a center frequency when Data Slice DS4, DS5, DS6, or DS7 is read. A center frequency $f_4$ denotes a center frequency when Data Slice DS8 is read.

Each of Data Slices DS0 and DS3 includes a narrowband notch. A broadband notch is included in a gap between Data Slices DS3 and DS4 and a gap between Data Slices DS7 and DS8. In this case, first, if a signal is received and processed using an Rx band E centered at the center frequency $f_4$, the broadband notch is included, so that it is difficult to obtain L1 information. Therefore, it is conceived that this Rx band E (center frequency $f_4$) is not suitable for the Rx band (center frequency) for obtaining L1 information.

If a signal is received and processed using an Rx band D centered at the center frequency $f_3$, it is supposed that there is an influence (interference) from an interference wave generated in the broadband notch in the left side of Data Slice DS4 and the broadband notch in the right side of Data Slice DS7. Therefore, in a case where L1 information is obtained using a signal received in the Rx band D, it may be difficult to appropriately obtain (stably obtain) L1 information due to an influence of the notch.

Setting the notch which is a no-signal frequency band where a desired signal is not transmitted in the Tx side generates a high possibility that an interference wave exists and a possibility that it is difficult to appropriately obtain L1 information due to an influence of such an interference wave. For this reason, as the Condition 1, it is derived that a center frequency distant from the notch is suitable for a center frequency for obtaining L1 information.

The Rx band A centered at the center frequency $f_0$ and the Rx band C centered at the center frequency $f_2$ include a narrowband notch. The L1 information obtained using such Rx bands has some missing data, and the missing data may be recovered through error correction. Therefore, although the L1 information itself can be obtained, error correction is performed. For this reason, such Rx bands (center frequencies) are not suitable for stably and appropriately obtaining L1 information. Similarly, in this case, as the Condition 1, it is derived that a center frequency distant from the notch is suitable for a center frequency for obtaining L1 information.

Since the Rx band A centered at the center frequency $f_0$ is located at an end of C2_System, a guard band is provided in the left end. Therefore, while a possibility of an interference wave is low, there is a high possibility that there is a neighboring channel. Accordingly, there is a possibility that there is an influence of the neighboring channel although negligible. Therefore, it is conceived that it is desirable to avoid the Rx band A. For this reason, as the Condition 2, it is derived that a center frequency distant from an end of C2_System is suitable for a center frequency for obtaining L1 information.

In the case of C2_System of FIG. 10, the center frequency $f_1$ satisfies Conditions 1 and 2. Therefore, in the case of C2_System of FIG. 10, if L1 information is obtained from Preamble Symbol received by setting the Rx band B centered at the center frequency $f_1$, there is a high possibility to stably and accurately obtain L1 information.

Although not illustrated, if there is no center frequency satisfying Condition 1 or 2 unlike the Rx band B centered at the center frequency $f_1$, and an Rx band having a notch is unavoidably set, it is desirable to select a center frequency capable of setting an Rx band less influenced by the notch. For this purpose, the Rx band less influenced by the notch is an Rx band having a notch as small as possible. A small notch means that a total width of the notch is small. For this reason, as the Condition 3, it is derived that a center frequency where a total width of the notch in the Rx band is small is suitable for a center frequency for obtaining L1 information.

In this manner, the center frequency satisfying the Conditions 1 to 3 is suitable for a center frequency for obtaining L1 information. The center frequency satisfying the Conditions 1 to 3 may be detected, for example, using a predetermined function.

In the Condition 1, the center frequency is distant from the notch. Therefore, a function f1(x) for determining whether or not the Condition 1 is satisfied can be defined as a function f1(x) proportional to the distance from the notch. In the Condition 2, the center frequency is distant from an end of C2_System. Therefore, a function f2(x) for determining whether or not the Condition 2 is satisfied can be defined as a function F2(x) proportional to a distance from an end of C2_System. In the Condition 3, a total width of the notch in the Rx band is small. Therefore, a function f3(x) for determining whether or not the Condition 3 is satisfied can be defined as a function f3(x) that adds widths of the notch in the Rx band.

A center frequency optimal to read L1 information (hereinafter, referred to as an optimal center frequency) may be detected using all of the functions f1(x), f2(x), and f3(x). Alternatively, the optimal center frequency may be detected using one or two of the functions f1(x), f2(x), and f3(x). In a case where the optimal center frequency is detected using a plurality of functions, the optimal center frequency may be detected using a value obtained by adding, subtracting, multiplying, or dividing the values of each function. Alternatively, the optimal center frequency may be detected using another function created based on the functions f1(x), f2(x), and f3(x).

A priority may be applied to the functions f1(x), F2(x), and f3(x), and a weight may be applied based on the priority. In a case where each of the functions f1(x), f2(x), and f3(x) is used, for example, a frequency where the function f1(x) results in a high value may be applied to the function f2(x) as a candidate. In this manner, the optimal center frequency may be detected by sequentially narrowing down the candidate.

Here, description will be continued by assuming that an optimal center frequency is detected based on a function g(x) which is proportional to the functions f1(x), f2(x), and f3(x).

Function $g(x)=f(f1(x),f2(x),f3(x))$

A peak position of the function g(x) is referred to as an optimal center frequency.

Figure 11:
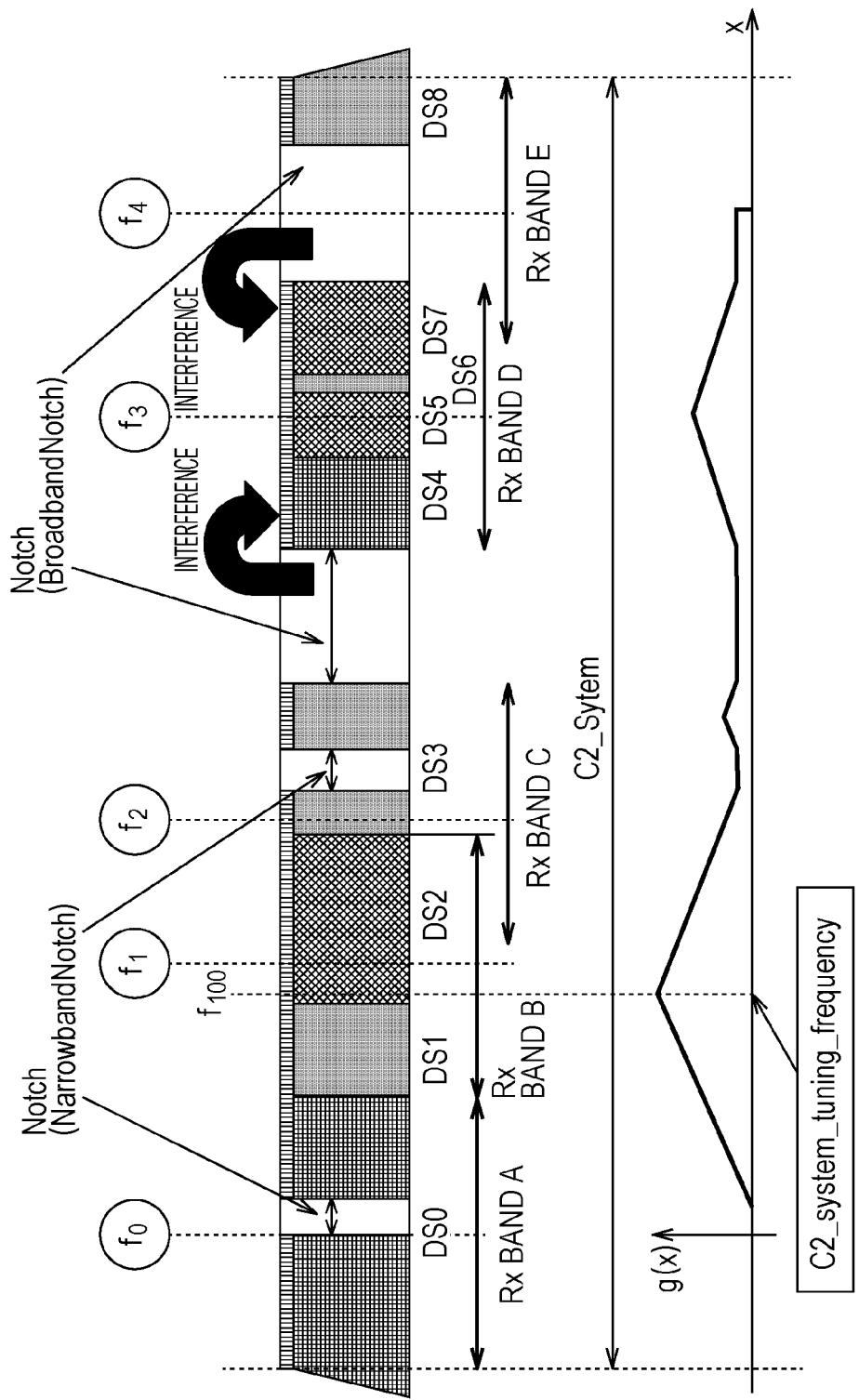
FIG. 11 is a diagram illustrating detection of the optimal center frequency.

FIG. 11 is a graph illustrating an exemplary value of the function g(x). In FIG. 11, a graph of the value obtained by computing the function g(x) for an example of C2_System of FIG. 10 is illustrated in the lower half. In the graph of FIG. 11, a peak is placed in any frequency $f_{100}$. This frequency $f_{100}$ is set as an optimal center frequency.

In other words, a center frequency closest to the frequency $f_{100}$ is set as the optimal center frequency. In the case of FIG. 11, the center frequency $f_1$ is set as the optimal center frequency. In this case, in other words, the center frequency computed from "DSLICE_TUNE_POS" and closest to the frequency $f_{100}$ is set as the optimal center frequency.

Alternatively, a center frequency of Data Slice closest to the frequency $f_{100}$ is set as the optimal center frequency. In the case of FIG. 11, a frequency closest to the frequency $f_{100}$ out of a frequency located in the center of the frequency band of Data Slice DS1 or a frequency located in the center of the frequency band of Data Slice DS2 is set as the optimal center frequency.

Figure 7:
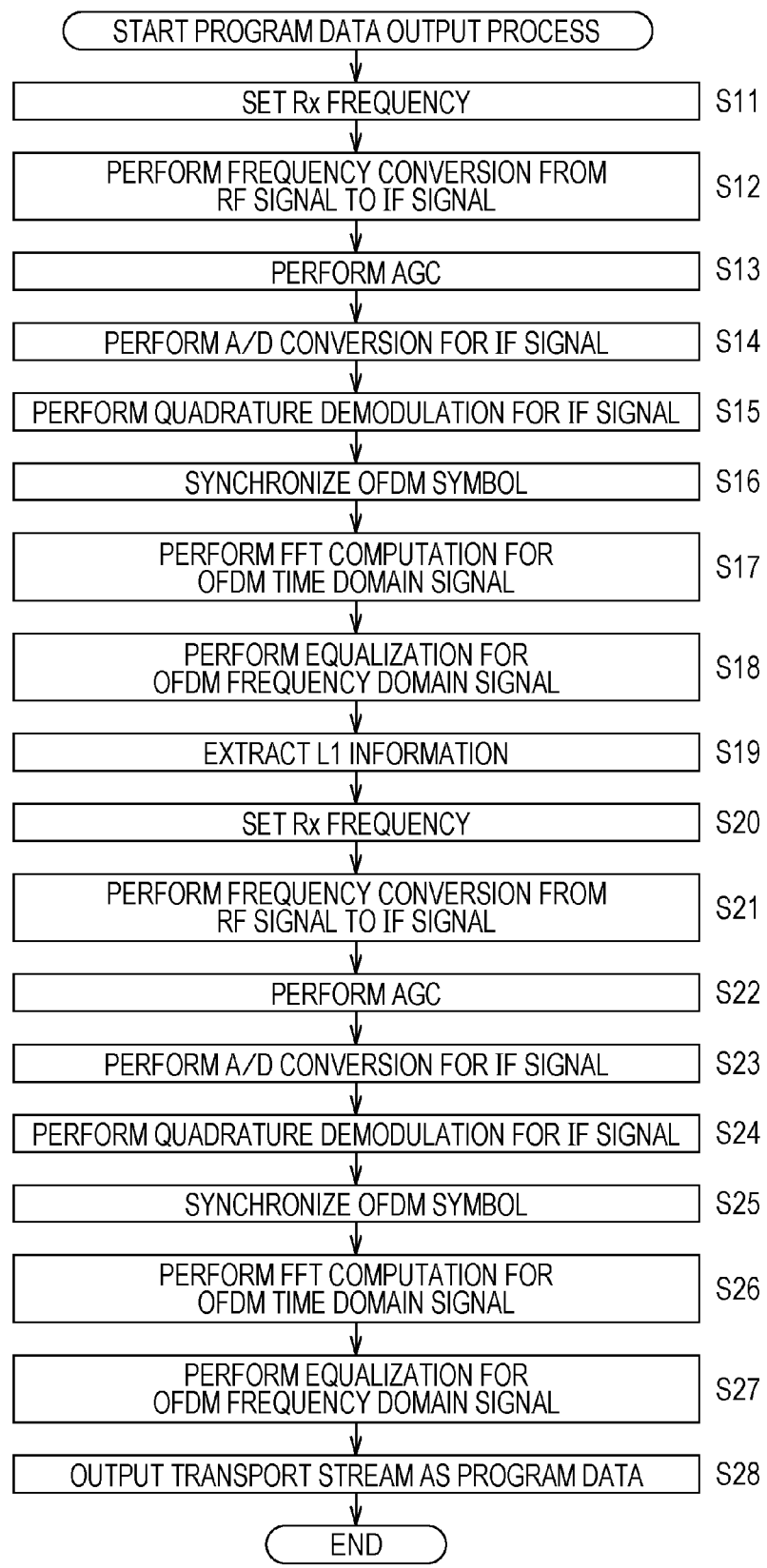
FIG. 7 is a flowchart illustrating operations of the receiving apparatus.

The optimal center frequency obtained as described above is stored in the memory unit 20 (FIG. 1) as a frequency set when L1 information is obtained. The optimal center frequency is read from the memory unit 20 when it is necessary to obtain the L1 information, for example, when step S11 (FIG. 7) in the operation of the receiving apparatus 1 described above is executed. In other words, the obtained optimal center frequency is used as "C2_system_tuning_frequency".

In this manner, according to DVB-C2, the same L1 information is arranged in different frequency bands and is repeatedly transmitted. Therefore, apparently, it is desirable to obtain the L1 information using a stable frequency rather than a probably unstable frequency. Therefore, as described above, if a signal is transmitted across a broad band by arranging the same control information in different frequency bands, it is possible to detect a frequency (Rx band set using that frequency) capable of receiving the control signal most stably, analyzing the control signal, and obtaining accurate information and obtain the control information again using that frequency. This is important to reliably process the broadband signal.

However, even in a case where a signal is received by setting such an Rx band suitable for obtaining L1 information, typically, channel scanning is performed when the receiving apparatus 1 is initially powered on or when there is a change in an installation site. Then, an Rx band suitable for obtaining L1 information is set. Here, description will be made for the channel scanning.

Figure 12:
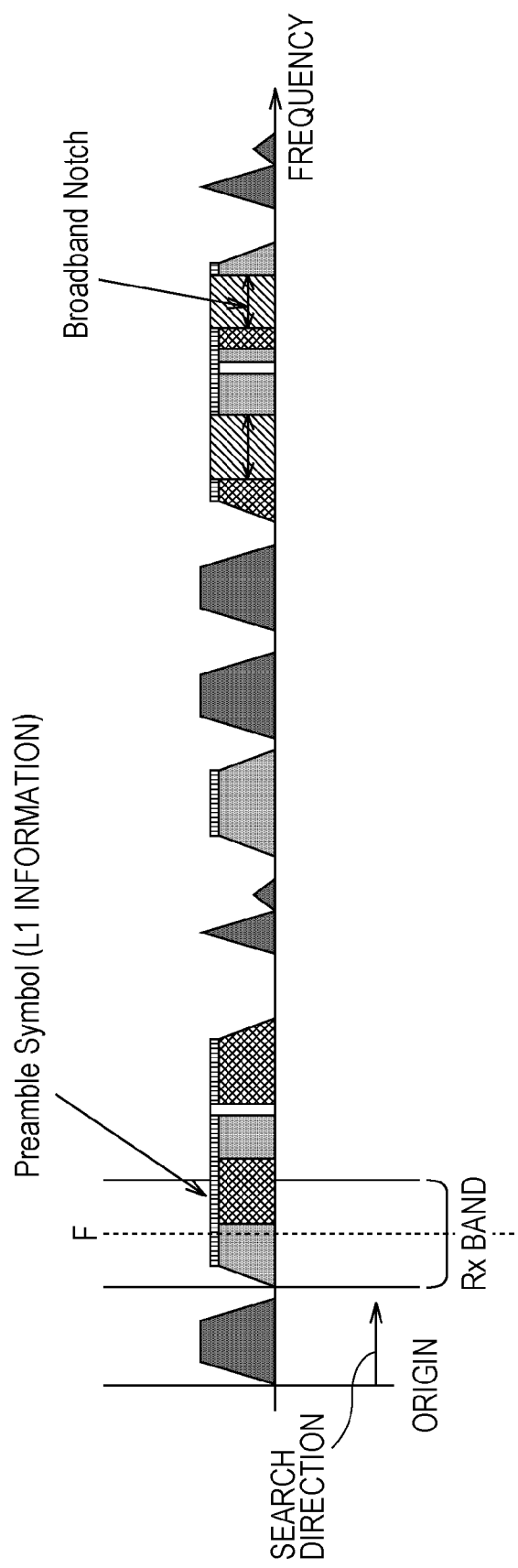
FIG. 12 is a diagram illustrating channel scanning.

FIG. 12 is a diagram illustrating obtainment of L1 information at the time of channel scanning. The channel scanning of a DVB-C2 signal is performed by shifting a frequency in a search direction from a predetermined frequency as an origin. In addition, in a case where a C2_System signal is found in any frequency F, L1 information is obtained from Preamble Symbol received in the Rx band centered at the frequency F. Here, if the L1 information is obtained, information on the entire C2_System signal can be obtained.

In a case where a frequency for obtaining L1 information at the time of channel scanning is established depending on a country, a local province, management, a regulation, or the like, the L1 information may be obtained using the established frequency. In addition, in a case where a part of L1 information is provided as public information depending on a country, a local province, management, a regulation, or the like, such information may also be used.

Since a position or width of the notch, a position of Data Slice, and the like can be obtained from the obtained L1 information, it is possible to obtain the optimal center frequency as described above. While the L1 information can be obtained using frequencies other than the optimal center frequency, an optimal center frequency capable of stably obtaining L1 information is obtained and is stored in the memory unit 20, and the L1 information is then obtained using the stored optimal center frequency.

In this manner, according to the present technology, it is possible to set a frequency capable of stably obtaining L1 information.

Although, in the embodiments described above, a center frequency satisfying Conditions 1 to 3 is detected, the following conditions may be further added in addition to these Conditions. In the receiving apparatus 1, a channel condition is predicted based on a bit error rate (BER), a modulation error ratio (MER), a continuous wave (CW) detector, and the like. Using the prediction result, a center frequency is detected. For example, if a bit error rate is high, it can be determined that the corresponding channel has a bad receiving condition. Therefore, it is conceived that it is not desirable to obtain L1 information using such a channel. Therefore, in a case where the center frequency satisfying Conditions 1 to 3 is included in such a channel, any other center frequency may be set.

Although description in the embodiments described above has been made by exemplifying a DVB-C2 and L1 information, the present technology can be applied to other broadcast schemes or transmission schemes. Needless to say, the present technology can be applied although the obtained information may different depending on the applied scheme. Although description in the present embodiment has been made by exemplifying a DVB-C2, the present technology can be applied to other broadcast schemes. For example, the present technology can be applied to a broadcast scheme or a communication scheme having a frequency band that does not transmit a signal corresponding to a notch. Furthermore, the present technology can be applied to a communication field and the like, without limiting to broadcasting, such as when a desired signal (data) is extracted from a broadband signal.

Although description in the embodiments described above has been made by assuming that the operation is performed in the receiving apparatus 1 side, the operation may be performed in the Tx side that transmits the aforementioned signal. For example, in a case where the transmit side generates and transmits the signal as illustrated in FIG. 2 and creates L1 information of such a transmitted signal (C2_System), the transmitted signal may be analyzed as described above to detect a center frequency capable of stably obtaining the L1 information, and information on the corresponding center frequency may be provided to the Rx side.

For example, information on the center frequency detected as "C2_system tuning_frequency" may be provided to the Rx side. In addition, the Rx side can stably and accurately obtain L1 information based on information of the center frequency provided by the Tx side.

<Recording Medium>

A series of the aforementioned processes may be executed using hardware or software. In a case where a series of processes is executed using software, a program embodied in the software is installed in a computer. Here, the computer includes, for example, a computer integrated into dedicated hardware, a general-purpose personal computer capable of executing various functions by installing various programs, and the like.

Figure 13:
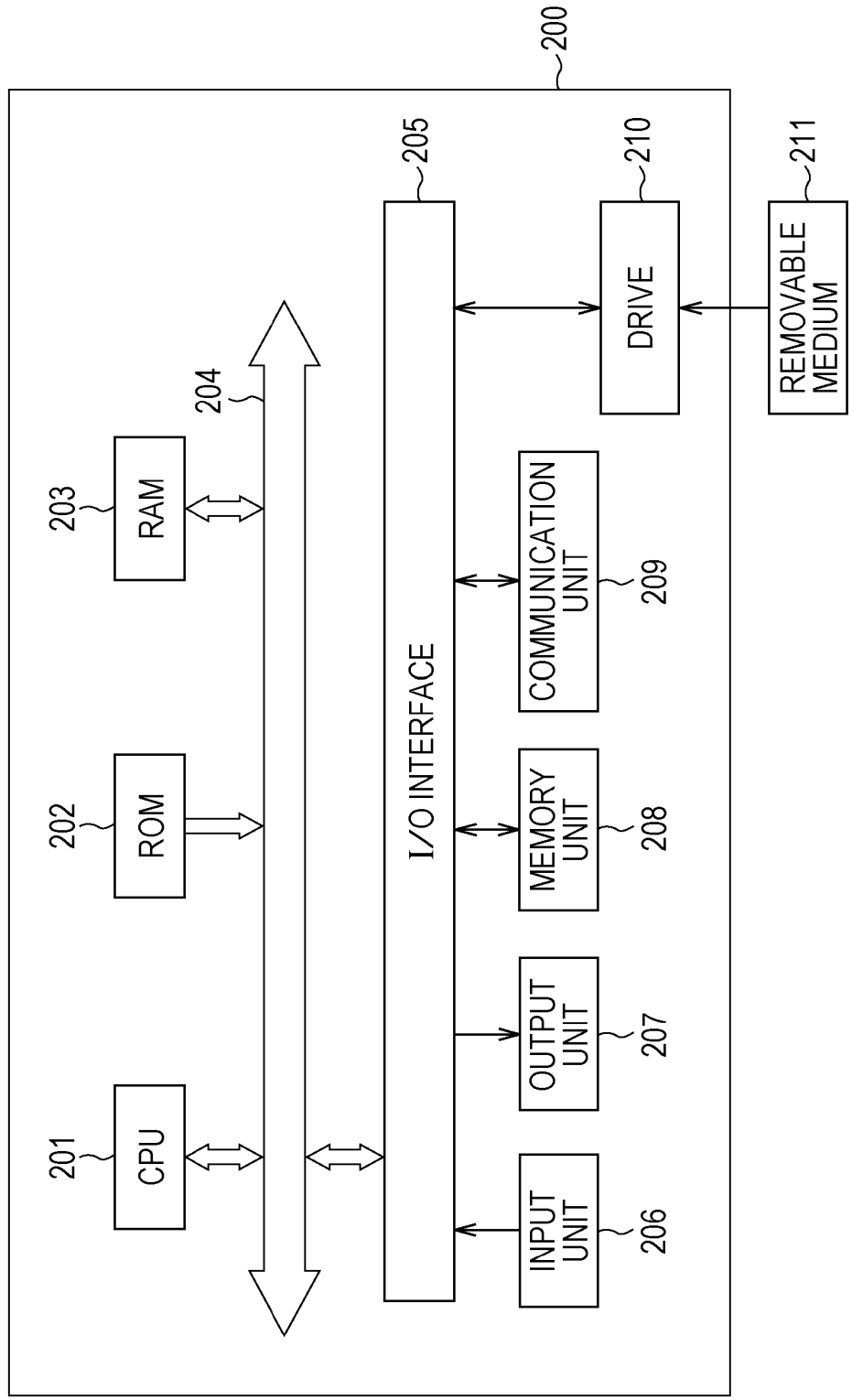
FIG. 13 is a diagram illustrating a recording medium.

FIG. 13 is a block diagram illustrating an exemplary configuration of hardware of a computer that executes a series of the aforementioned processes using a program. In the computer, a central processing unit (CPU) 201, a read-only memory (ROM) 202, and random access memory (RAM) 203 are connected to each other via a bus 204. In addition, an input/output (I/O) interface 205 is connected to the bus 204. An input unit 206, an output unit 207, a memory unit 208, a communication unit 209, and a drive 210 are connected to the I/O interface 205.

The input unit 206 includes a keyboard, a mouse, a microphone, and the like. The output unit 207 includes a display, a loudspeaker, and the like. The memory unit 208 includes a hard disk, a nonvolatile memory, and the like. The communication unit 209 includes a network interface and the like. The drive 210 drives a removable medium 211 such as a magnetic disc, an optical disc, an opto-magnetic disc, or a semiconductor memory.

In the computer configured as described above, a series of the processes described above is performed by causing the CPU 201 to load the program, for example, stored in the memory unit 208 on the RAM 203 via the I/O interface 205 and the bus 204 and execute the program.

The program executed by the computer (CPU 201) may be recorded and provided, for example, in a removable medium 211 such as a package medium. In addition, the program may be provided via a wired/wireless transmission medium such as a local area network (LAN), the Internet, or digital satellite broadcasting.

In a computer, the program may be installed in the memory unit 208 via the I/O interface 205 by mounting the removable medium 211 in the drive 210. Alternatively, the program may be received by the communication unit 209 via a wired/wireless transmission medium and may be installed in the memory unit 208. Alternatively, the program may be installed in the ROM 202 or the memory unit 208 in advance.

The program executed by the computer may be a program that processes steps in a time-series manner according to the sequence described herein or may be a program executed in parallel or at a necessary timing such as a call.

Herein, a system refers to an entire apparatus including a plurality of units.

The embodiments of the present technology are not limited to those described above. Instead, they may be variously changed or modified without departing from the spirit and scope of the invention.

The present technology may be embodied as the following configurations.

(1)

A receiving apparatus includes: a receiving (Rx) unit that receives a broadband signal obtained by arranging same control information in different frequency band; and a detection unit that detects a frequency where the control information is stably received.

(2)

The receiving apparatus of (1), wherein the detection unit obtains the control information and detects the frequency based on the obtained control information.

(3)

The receiving apparatus of (1) or (2), wherein the broadband signal is a signal conforming to a DVB-C2 standard, and the control information is L1 information.

(4)

The receiving apparatus of any one of (1) to (3), wherein the broadband signal is a signal including a no-signal band which is a frequency band that does not transmit a desired signal, and the detection unit detects a frequency distant from the no-signal band.

(5)

The receiving apparatus of any one of (1) to (4), wherein the detection unit detects a frequency distant from an end of the broadband signal.

(6)

The receiving apparatus of any one of (1) to (5), wherein the detection unit detects a frequency where a total width of the no-signal band existing in an Rx band set using a predetermined frequency is small.

(7)

The receiving apparatus of any one of (1) to (6), wherein the detection unit detects another frequency if it is determined that a receiving condition is bad when a signal is received using the Rx band set using the frequency detected by the detection unit.

(8)

A receiving method includes: receiving a broadband signal obtained by arranging same control information in different frequency bands; and detecting a frequency where the control information is stably received.

(9)

A program causes a computer to function as: a receiving (Rx) unit that receives a broadband signal obtained by arranging same control information in different frequency band; and a detection unit that detects a frequency where the control information is stably received.

REFERENCE SIGNS LIST

1 Receiving apparatus
11 Antenna
12 Tuner
13 AGC unit
14 A/D conversion unit
15 Quadrature demodulation unit
16 OFDM demodulation unit
17 Error correction unit
18 Control unit
19 Transmission parameter interpreting unit
20 Memory unit
31 Synchronization unit
32 FFT computation unit
33 OFDM equalization unit

The invention claimed is:

1. A receiving apparatus, comprising:
   a processor; and
   a memory, the memory storing program code executable by the processor to perform operations comprising:
      receiving a broadband signal which includes identical control information in different frequency bands; and
      detecting a center frequency for receiving the control information, the center frequency being between narrowband notches in the broadband signal, the control information being received from a data slice that is devoid of a no-signal frequency band and the center frequency being distant from high and low frequency extents of the broadband signal.

2. The receiving apparatus according to claim 1, wherein the broadband signal is a signal conforming to a DVB-C2 standard, and
   the control information is L1 information.

3. The receiving apparatus according to claim 1, wherein the broadband signal is a signal including a no-signal band which is a frequency band that does not transmit a desired signal, and
   the center frequency is distant from the narrowband notches.

4. The receiving apparatus according to claim 1, wherein the center frequency is detected where a total width of the narrow band existing in a receiving band set using a predetermined frequency is small.

5. The receiving apparatus according to claim 1, wherein the detection unit detects another frequency if it is determined that a receiving condition is unfavorable when a signal is received using the receiving band set using the frequency detected by the detection unit.

6. The receiving apparatus, according to claim 1, wherein the notches are in the no-signal band in a transmission signal.

7. A receiving method, comprising:
   receiving a broadband signal which includes identical control information in different frequency bands; and
   detecting a center frequency for receiving the control information, the center frequency being between narrowband notches in the broadband signal, the control information being received from a data slice that is devoid of a no-signal frequency band and the center frequency being distant from high and low frequency extents of the broadband signal.

8. The receiving method, according to claim 7, wherein the notches are in the no-signal band in a transmission signal.

9. A non-transitory computer readable medium storing program code for image signal processing, the program code being executable by a processor to perform operations comprising:
   receiving a broadband signal which includes identical control information in different frequency bands; and
   detecting a center frequency for receiving the control information, the center frequency being between narrowband notches in the broadband signal, the control information being received from a data slice that is devoid of a no-signal frequency band and the center frequency being distant from high and low frequency extents of the broadband signal.

10. The non-transitory computer readable medium, according to claim 9, wherein the notches are in the no-signal band in a transmission signal.

* * * * *